United States Patent [19]
Harmon

[11] Patent Number: 5,972,422
[45] Date of Patent: Oct. 26, 1999

[54] METHOD FOR LOW BAKE REPAIR OF COMPOSITE COLOR-PLUS-CLEAR COATINGS, AND COMPOSITIONS FOR USE THEREIN

[75] Inventor: Herbert L. Harmon, Southfield, Mich.

[73] Assignee: BASF Corporation, Southfield, Mich.

[21] Appl. No.: 09/071,083

[22] Filed: May 1, 1998

[51] Int. Cl.$^6$ .............. B05D 1/38; B05D 3/02; B05D 7/26; B32B 35/00

[52] U.S. Cl. .............. 427/140; 427/142; 427/407.1; 427/409; 427/410

[58] Field of Search .............. 427/140, 142, 427/407.1, 409, 410

[56] References Cited

U.S. PATENT DOCUMENTS

| | | | |
|---|---|---|---|
| 3,912,548 | 10/1975 | Faigen | 427/409 |
| 4,210,565 | 7/1980 | Emmons | 427/388.4 |
| 4,788,083 | 11/1988 | Dammann et al. | 427/340 |
| 4,814,382 | 3/1989 | Hoy et al. | 525/113 |
| 4,820,830 | 4/1989 | Blank | 560/158 |
| 5,100,735 | 3/1992 | Chang | 428/515 |
| 5,134,205 | 7/1992 | Blank | 525/509 |
| 5,157,100 | 10/1992 | Babjak et al. | 528/73 |
| 5,225,248 | 7/1993 | Stephenson | 427/333 |
| 5,300,328 | 4/1994 | Rehfuss et al. | 427/388.3 |
| 5,576,063 | 11/1996 | Briggs et al. | 427/386 |
| 5,578,345 | 11/1996 | Moy | 427/409 |
| 5,605,965 | 2/1997 | Rehfuss et al. | 525/100 |
| 5,633,037 | 5/1997 | Mayer | 427/142 |
| 5,665,433 | 9/1997 | Moussa et al. | 427/388.3 |
| 5,770,678 | 6/1998 | Drysdale et al. | 528/233 |
| 5,821,323 | 10/1998 | Bright et al. | 528/254 |
| 5,883,164 | 3/1999 | Katoot | 524/104 |

FOREIGN PATENT DOCUMENTS

| | | |
|---|---|---|
| 2161496 | 10/1995 | Canada. |
| WO 94/04582 | 3/1994 | European Pat. Off.. |
| WO 94/10213 | 5/1994 | European Pat. Off.. |
| 0 709 415 A2 | 10/1995 | European Pat. Off.. |

OTHER PUBLICATIONS

P. E. Ferrell et al.; The Reactions of Amines with Melamine Formaldehyde Crosslinkers in Thermoset Coatings; 12/95;Vol. 67, No. 851.

Chemical Eng pp Table of contents–13 (No Date).

*Primary Examiner*—Diana Dudash
*Attorney, Agent, or Firm*—Mary E. Golota

[57] ABSTRACT

The invention provides a method for providing a low bake repair to a cured coating, especially a composite coating and low bake repair compositions for use therein. The method of the invention involves the provision of a cured coated surface and the application of a low bake repair coating to at least a portion of the cured coated surface. The low bake repair coating of the invention has (A) a film forming component comprising (a) a first component comprising a compound having appended thereto at least one carbamate or urea functional group, or a group convertible to a carbamate or urea group, and (b) a second component comprising a compound reactive with said carbamate or urea groups on component (a), and (B) a catalyst comprising a compound selected from the group consisting of $Al(ClO_4)_2$, $Zr(ClO_4)_2$, and $Al(NO_3)_2$. The low bake repair coating is cured at a temperature of less than 200° F. for a time sufficient to cure the low bake repair coating.

17 Claims, No Drawings

METHOD FOR LOW BAKE REPAIR OF COMPOSITE COLOR-PLUS-CLEAR COATINGS, AND COMPOSITIONS FOR USE THEREIN

FIELD OF THE INVENTION

This invention relates to the repair of composite color-plus-clear coatings having improved appearance, especially to low bake repairs having curing temperatures of 200° F. or less, and to low bake repair compositions.

BACKGROUND OF THE INVENTION

Composite color-plus-clear coatings are widely utilized in the coatings art. They are particularly desirable where exceptional gloss, depth of color, distinctness of image, or special metallic effects are required. The automotive industry has made extensive use of color-plus-clear composite coatings for automotive body panels.

As used herein, the term "composite color-plus-clear" relates to composite coating systems requiring the application of a first coating, typically a colored basecoat coating, followed by the application of a second coating, generally a clearcoat, over the noncured or "wet" first coating. The applied first and second coatings are then cured. Thus, such systems are often described as "wet on wet" or "two coat/one bake". Drying processes which fall short of complete cure may be used between the application of the coatings.

Clearcoats used in color-plus-clear systems must have an extremely high degree of clarity in order to achieve the desired visual effects. High gloss coatings also require a low degree of visual aberrations at the surface in order to achieve the desired visual effect such as high distinctness of image (DOI). As a result, clearcoats of color-plus-clear systems are especially susceptible to the phenomenon known as environmental etch, i.e., spots or marks on or in the clear finish that often cannot be rubbed out.

Although many compositions have been proposed for use as the clearcoat of a color-plus-clear composite coating, prior art clearcoat coatings often suffer from disadvantages such as coatability problems, compatibility problems with the colored basecoat, solubility problems, and/or insufficient resistance to environmental etch.

Clearcoat coating compositions exhibiting many advantages over prior art compositions, especially with respect to environmental etch, were disclosed in U.S. Pat. Nos. 5,474,811 and 5,356,669. The disclosed clear coating compositions comprise a first component comprising a polymer backbone having appended thereto at least one carbamate functional group, and a second component comprising a compound having a plurality of functional groups that are reactive with said carbamate groups.

Surface imperfections and/or defects can occur during the multistep application process typically used to apply composite coatings. Such surface imperfections and/or defects are sometimes not repairable until after the curing of the composite coatings. In some instances, the repair process occurs subsequent to the addition of other components to a coated article. The additional components may have melting or deformation temperatures which are lower than the cure temperature of the original composite coating.

Ideally, it would be desirable to repair surface imperfections and/or defects with the original composite coating or component coatings thereof, in order to obtain uniform appearance and performance properties over the whole of the coated article. In particular, it would be desirable to provide a repair coating which provides the same performance and appearance properties of the original composite coating or a component coating thereof.

However, the cure schedule for traditional composite coatings typically requires temperatures greater than the melt or deformation temperature of some article components added subsequent to the original composite coating application process.

Thus, there is a need for a curable coating composition suitable for use in low bake repair of color-plus-clear composite coatings or coating components thereof.

More particularly, there is a need for a curable coating composition which can be used in low bake repair of color-plus clear composite coatings or components thereof, which provides desirable performance and appearance properties and cures at a temperature less than that of the cure temperature required for the original color-plus-clear composite coating.

It would be particularly advantageous to provide a curable coating composition for use in low bake repair of color-plus clear composite coatings which provides the advantages of carbamate functional resin containing coatings and cures at a temperature of 200° F. or less, especially 190° F. or less.

Desirable performance properties in a low bake repair curable coating composition are good solvent resistance, hardness and environmental etch resistance.

The low bake repair curable coating composition should also cure at curing conditions which make repair commercially feasible and advantageous, i.e., 5 to 15" at 200° F. or less.

Advantageous appearance properties are a colorless appearance, high DOI, and a glossy appearance over a wide range of basecoat and clearcoat film thickness.

SUMMARY OF THE INVENTION

It is thus an objective of the invention to provide a curable coating composition for use in low bake repair of composite color-plus-clear coatings and a method for the low bake repair of composite color-plus-clear coatings.

More particularly, it is an objective of the invention to provide a low bake repair curable coating composition comprising a component (a) having a compound having appended thereto at least one carbamate or urea functional group, or a group convertible to a carbamate or urea group, and a second component (b) which is a compound reactive with said carbamate or urea groups on component (a).

It has now been unexpectedly discovered that the foregoing can be achieved with the use of a particular low bake repair curable coating composition comprising a film forming component (A) which includes a first component (a) comprising a compound having appended thereto at least one carbamate or urea functional group, or a group convertible to a carbamate or urea group, and a second component (b) comprising a compound reactive with said carbamate or urea groups on component (a), and a low bake catalyst (B) comprising a compound selected from the group consisting of $Al(ClO_4)_2$, $Zr(ClO_4)_2$, and $Al(NO_3)_2$. The invention provides a method of making a low bake repair to a previously cured coating wherein a low bake repair coating is applied to at least a portion of a cured coated surface. The low bake repair coating composition comprises a film forming component (A) comprising a first component (a) comprising a compound having appended thereto at least one carbamate or urea functional group, or a group convertible to a carbamate or urea group, a second component (b) comprising a compound reactive with said carbamate or urea groups on component (a), and a catalyst (B) comprising a compound selected from the group consisting of Al(ClO$_4$)$_2$, Zr(ClO$_4$)$_2$, and Al(NO$_3$)$_2$. The applied low bake repair coating is then cured at a temperature of less than 200° F. for a time sufficient to effect cure.

DETAILED DESCRIPTION

The present inventions provide a low bake repair coating composition for use in repairing surface imperfections and/or defects in color-plus-clear composite coatings and a method of making such low bake repairs.

The method of the invention provides a way to repair surface imperfections and/or defects in cured coatings, especially composite coatings. In particular, the invention provides a way to effect low bake repairs of such composite coatings while still obtaining desirable performance and appearance properties in the repaired area.

As used herein, the term "low bake" refers to cure schedules requiring a temperature of less than 200° F. and a time of less than 20 minutes. Particularly desired low bake cure schedules require 15 minutes or less at 190° F. A most preferred low bake schedule is 10 minutes at 180° F.

The method of the invention comprises providing a cured coated surface, applying a low bake repair coating to at least a portion of the cured coated surface, the low bake repair coating comprising, (A) a film forming component comprising (a) a first component comprising a compound having appended thereto at least one carbamate or urea functional group, or a group convertible to a carbamate or urea group, and (b) a second component comprising a compound reactive with said carbamate or urea groups on component (a), and (B) a catalyst comprising a compound selected from the group consisting of Al(ClO$_4$)$_2$, Zr(ClO$_4$)$_2$, and Al(NO$_3$)$_2$, and subjecting the low bake repair coating to a temperature of less than 200° F. for a time sufficient to cure the low bake repair coating.

The following discussion with respect to component (A) particularly refers to the low bake repair coating composition but may also pertain to a particularly preferred cured coating to which the low bake repair coating composition is applied.

The term "film forming component (A)" as used herein refers to the binder or solid material which forms the polymeric film portion of the cured film. Film forming component (A) of the curable coating composition of the invention includes a first component (a) which comprises a compound having appended thereto at least one carbamate or urea functional group, or a group convertible to a carbamate or urea group and a second component (b) comprising a compound reactive with said carbamate or urea groups on component (a).

First component (a) comprises a compound selected from the group consisting of oligomers and polymers having appended thereto more than one carbamate group or more than one urea group, or more than one group convertible to a carbamate or urea group.

Oligomers typically have a molecular weight of between 148 and 2000, the preferred molecular weight for the oligomers is between 900 and 1092; polymers typically have a molecular weight of between 2,000 and 20,000, the preferred molecular weight for the polymers is between 4000 and 6000. Mixtures of said oligomers and polymers may be used as component (A). Molecular weight can be determined by the GPC method using a polystyrene standard. The carbamate or urea content of the polymer, on a molecular weight per equivalent of carbamate or urea functionality, will generally be between 200 and 1200, and preferably between 300 and 800.

Carbamate groups can generally be characterized by the formula

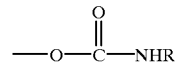

wherein R is H or alkyl, preferably of 1 to 4 carbon atoms. Preferably, R is H or methyl, and more preferably R is H.

Urea groups can generally be characterized by the formula

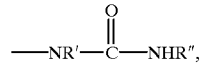

wherein R' and R" each independently represent H or alkyl, preferably of 1 to 4 carbon atoms, or R' and R" may together form a heterocyclic ring structure (e.g. where R' and R" form an ethylene bridge).

Groups that can be converted to carbamate include cyclic carbonate groups, epoxy groups, and unsaturated bonds. Cyclic carbonate groups can be converted to carbamate groups by reaction with ammonia or a primary amine, which ring-opens the cyclic carbonate to form a β-hydroxy carbamate. Epoxy groups can be converted to carbamate groups by first converting to a cyclic carbonate group by reaction with CO$_2$. This can be done at any pressure from atmospheric up to supercritical CO$_2$ pressures, but is preferably under elevated pressure (e.g. 60–150 psi). The temperature for this reaction is preferably 60–150° C. Useful catalysts include any that activate an oxirane ring, such as tertiary amine or quaternary salts (e.g. tetramethyl ammonium bromide), combinations of complex organotin halides and alkyl phosphonium halides (e.g., ((CH)$_3$SnI, BU$_4$SnI, Bu$_4$PI, and (CH$_3$)$_4$PI), potassium salts (e.g., K$_2$CO$_3$, KI), preferably in combination with crown ethers, tin octoate, calcium octoate, and the like. The cyclic carbonate group can then be converted to a carbamate group as described above. Any unsaturated bond can be converted to carbamate groups by first reacting with peroxide to convert to an epoxy group, then with CO$_2$ to form a cyclic carbonate, and then with ammonia or a primary amine to form the carbamate.

Oligomeric compounds useful as first component (a), and having more than one carbamate functional group, have the general formula

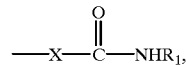

wherein X is O, S or NH, R$_1$ is H or alkyl of 1 to 4 carbon atoms. The compounds useful as oligomeric component (a) according to the invention can be prepared in a variety of ways.

The carbamate can be primary, terminating in an NH$_2$ group, or secondary, terminating in an NHR group. In a preferred embodiment, the carbamate is primary.

One way to prepare oligomeric compounds useful as component (a) is to react an alcohol ('alcohol' is defined herein as having one or more OH groups) with more than one urea to form a compound with carbamate groups. This reaction is accomplished by heating a mixture of the alcohol and ureas. This reaction is also performed under heat, preferably in the presence of a catalyst as is known in the art. Another technique is the reaction of an alcohol with cyanic acid to form a compound with primary carbamate groups (i.e., unsubstituted carbamates). Carbamates may also be prepared by reaction of an alcohol with phosgene and then ammonia to form a compound having primary carbamate groups, or by reaction of an alcohol with phosgene and then a primary amine to form a compound having secondary carbamate groups. Another approach is to react an isocyanate (e.g., HDI, IPDI) with a compound such as hydroxypropyl carbamate to form a carbamate-capped isocyanate derivative. Finally, carbamates can be prepared by a transcarbamylation approach where an alcohol is reacted with an alkyl carbamate (e.g., methyl carbamate, ethyl carbamate, butyl carbamate) to form a primary carbamate group-containing compound. This reaction is performed under heat, preferably in the presence of a catalyst such as an organometallic catalyst (e.g., dibutyltin dilaurate). Other techniques for preparing carbamates are also known in the art and are described, for example, in P. Adams & F. Baron, "Esters of Carbamic Acid", *Chemical Review*, v. 65, 1965.

Various alcohols can be used in the preparation of carbamate compounds useful as first component (a) according to the invention. They generally have from 1 to 200 carbon atoms, preferably 1–60 carbon atoms, and may be monofunctional or polyfunctional (preferably a functionality of 2 to 3), aliphatic, aromatic, or cycloaliphatic. They may contain just OH groups, or they may contain OH groups plus heteroatoms such as O, S, Si, N, P, and other groups such as ester groups, ether groups, amino groups, or unsaturated sites. Examples of useful alcohols include 1,6-hexanediol, 1,2-hexanediol, 2-ethyl-1,3-hexanediol, ethyl-propyl-1,5-pentanediol, 2-methyl-2,4-pentanediol, 2,2,4-trimethyl-1,3-pentanediol, 2,4,7,9-tetramethyl-5-decyn-4,7-diol, 1,3-dihydroxyacetone dimer, 2-butene-1,4-diol, pantothenol, dimethyltartrate, pentaethylene glycol, dimethyl silyl dipropanol, and 2,2'-thiodiethanol.

Polymeric compounds suitable for use in first component (a) are selected from the group consisting of polyester, epoxy, alkyd, urethane, acrylic, polyamide, and polysilane polymers and mixtures thereof, wherein the polymer has more than one carbamate functional group appended thereto.

In a preferred embodiment, first component (a) comprises a carbamate functional acrylic polymer represented by the randomly repeating units according to the following formula:

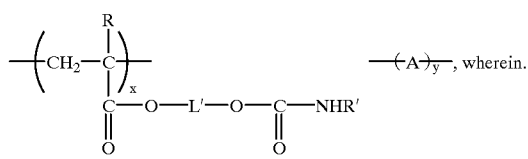

In the above formula, R represents H or $CH_3$. R' represents H, alkyl, preferably of 1 to 6 carbon atoms, or cycloalkyl, preferably up to 6 ring carbon atoms. It is to be understood that the terms alkyl and cycloalkyl are to include substituted alkyl and cycloalkyl, such as halogen-substituted alkyl or cycloalkyl. Substituents that will have an adverse impact on the properties of the cured material, however, are to be avoided. For example, ether linkages are thought to be susceptible to photo-induced hydrolysis, and should be avoided in locations that would place the ether linkage in the crosslink matrix. The values x and y represent weight percentages, with x being 10 to 90% and preferably 20 to 50%, and y being 90 to 10% and preferably 80 to 50%.

In the formula, A represents repeat units derived from one or more ethylenically unsaturated monomers. Such monomers for copolymerization with acrylic monomers are known in the art. They include alkyl esters of acrylic or methacrylic acid, e.g., ethyl acrylate, butyl acrylate, 2-ethylhexyl acrylate, butyl methacrylate, isodecyl methacrylate, hydroxyethyl methacrylate, hydroxypropyl acrylate, and the like; and vinyl monomers such as unsaturated m-tetramethyl xylene isocyanate (sold by American Cyanamid as TMI®), vinyl toluene, styrene, styrenic derivatives such as a-methyl styrene, t-butyl styrene, and the like.

L represents a divalent linking group, preferably an aliphatic of 1 to 8 carbon atoms, cycloaliphatic, or aromatic linking group of 6 to 10 carbon atoms. Examples of L include

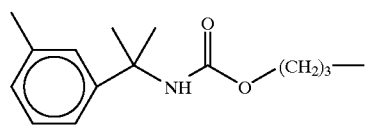

$-(CH_2)-$, $-(CH_2)_2-$, $-(CH_2)_4-$, and the like. In one preferred embodiment, $-L-$ is represented by $-COO-L'-$ where L' is a divalent linking group. Thus, in a preferred embodiment of the invention, polymeric first component (a) is represented by randomly repeating units according to the following formula:

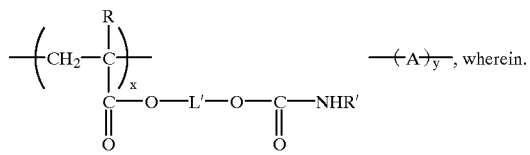

In this formula, R, R', A, x, and y are as defined above. L' may be a divalent aliphatic linking group, preferably of 1 to 8 carbon atoms, e.g., $-(CH_2)-$, $-(CH_2)_2-$, $-(CH_2)_4-$, and the like, or a divalent cycloaliphatic linking group, preferably up to 8 carbon atoms, e.g., cyclohexyl, and the like. However, other divalent linking groups can be used, depending on the technique used to prepare the polymer. For example, if a hydroxyalkyl carbamate is adducted onto an isocyanate-functional acrylic polymer, the linking group L' would include an $-NHCOO-$ urethane linkage as a residue of the isocyanate group. This carbamate functional acrylic polymer is described in U.S. Pat. No. 5,356,669 which is hereby incorporated by reference.

The first component (a) polymer used in the composition of the invention can be prepared in a variety of ways. One way to prepare such polymers is to prepare an acrylic monomer having a carbamate functionality in the ester portion of the monomer. Such monomers are well-known in the art and are described, for example in U.S. Pat. Nos. 3,479,328, 3,674,838, 4,126,747, 4,279,833, and 4,340,497, the disclosures of which are incorporated herein by reference. One method of synthesis involves reaction of a hydroxy ester with urea to form the carbamyloxy carboxylate (i.e., carbamate-modified acrylic). Another method of synthesis reacts an a,b-unsaturated acid ester with a hydroxy carbamate ester to form the carbamyloxy carboxylate. Yet another technique involves formation of a hydroxyalkyl carbamate by reacting ammonia, or a primary or secondary amine or diamine with a cyclic carbonate such as ethylene carbonate. The hydroxyl group on the hydroxyalkyl carbamate is then esterified by reaction with acrylic or methacrylic acid to form the monomer. Other methods of preparing carbamate-modified acrylic monomers are described in the art, and can be utilized as well. The acrylic monomer can then be polymerized along with other ethylenically-unsaturated monomers, if desired, by techniques well-known in the art.

An alternative route for preparing an acrylic polymer for use as component (a) in the composition of the invention is to react an already-formed polymer such as an acrylic polymer with another component to form a carbamate-functional group appended to the polymer backbone, as described in U.S. Pat. No. 4,758,632, the disclosure of which is incorporated herein by reference. One technique for preparing such acrylic polymers involves thermally decomposing urea (to give off ammonia and HNCO) in the presence of a hydroxy-functional acrylic polymer or copolymer to form a carbamate-functional acrylic polymer. Another technique involves reacting the hydroxyl group of a hydroxyalkyl carbamate with the isocyanate group of an isocyanate-functional acrylic or vinyl monomer to form the carbamate-functional acrylic. Isocyanate-functional acrylics are known in the art and are described, for example in U.S. Pat. No. 4,301,257, the disclosure of which is incorporated herein by reference. Isocyanate vinyl monomers are well-known in the art and include unsaturated m-tetramethyl xylene isocyanate (sold by American Cyanamid as TMI®). Yet another technique is to react the cyclic carbonate group on a cyclic carbonate-functional acrylic with ammonia in order to form the carbamate-functional acrylic. Cyclic carbonate-functional acrylic polymers are known in the art and are described, for example, in U.S. Pat. No. 2,979,514, the disclosure of which is incorporated herein by reference. A more difficult, but feasible way of preparing the polymer would be to trans-esterify an acrylate polymer with a hydroxyalkyl carbamate.

Groups capable of forming urea groups include amino groups that can be converted to urea groups by reaction with a monoisocyanate (e.g., methyl isocyanate) to form a secondary urea group or with cyanic acid (which may be formed in situ by thermal decomposition of urea) to form a primary urea group. This reaction preferably occurs in the presence of a catalyst as is known in the art. An amino group can also be reacted with phosgene and then ammonia to form a compound having primary urea group(s), or by reaction of an amino group with phosgene and then a primary amine to form a compound having secondary urea groups. Another approach is to react an isocyanate with a hydroxy urea compound to form a urea-capped isocyanate derivative. For example, one isocyanate group on toluene diisocyanate can be reacted with hydroxyethyl ethylene urea, followed by reaction of the other isocyanate group with an excess of polyol to form a hydroxy carbamate.

Second component (b) comprises a compound having functional groups reactive with said carbamate or urea groups on component (a). Suitable reactive groups include active methylol or methylalkoxy groups on aminoplast crosslinking agents or on other compounds such as phenol/formaldehyde adducts, acrylamide groups, isocyanate groups, siloxane groups, cyclic carbonate groups, and anhydride groups. Examples of (b) compounds include melamine formaldehyde resin (including monomeric or polymeric melamine resin and partially or fully alkylated melamine resin), urea resins (e.g., methylolureas such as urea formaldehyde resin, alkoxy ureas such as butylated urea formaldehyde resin), polymers having acrylamide groups, polymers having methylol or alkoxymethyl groups, polyanhydrides (e.g., polysuccinic anhydride), and polysiloxanes (e.g., trimethoxy siloxane). Aminoplast resin such as melamine formaldehyde resin or urea formaldehyde resin are especially preferred. Even more preferred are aminoplast resins where one or more of the amino nitrogens is substituted with a carbamate group for use in a process with a curing temperature below 150° C., as described in U.S. patent application Ser. No. 07/965,510 entitled "Carbamate-Defunctionalized Aminoplast Curing for Polymer Compositions" in the names of John W. Rehfuss and Donald L. St. Aubin.

The curable low bake repair coating composition of the invention further requires the use of a catalyst (B). It has unexpectedly been found that addition of a catalyst (B), to the film forming component (A) of the invention results in a curable coating composition that has the performance and appearance properties of traditional composite coatings but cures at a temperature and time schedule which facilitates it's use as a low bake repair coating composition.

Illustrative catalysts (B) are the metal perchlorates and aluminum nitrate. Metal perchlorates of particular interest are aluminum perchlorate and zirconium perchlorate. Aluminum perchlorate is most preferred as catalyst (B).

Catalyst (B) should be present in amount of from 0.01 to 7.0 percent by weight, based on the total nonvolatile amount of film forming component (A). More preferably, (B) should be present in an amount of from 0.1 to 2.0 percent by weight, and most preferably, in an amount of from 0.5 to 1.5 percent by weight, based on the total nonvolatile amount of film forming component (A).

Catalyst (B) may be added to the film forming component (A) immediately before use of the curable low bake repair coating composition.

A curable coating composition according to the present invention may be utilized, for example, in the form of a substantially solid powder, or a dispersion, and optionally solvent may be utilized in the composition of the present invention. It is often desirable that the composition is in a substantially liquid state, which can be accomplished with the use of a solvent. In general, depending on the solubility characteristics of component (A), the solvent can be any organic solvent or solvents and/or water. In a preferred embodiment, the solvent is a polar organic solvent. More preferably, the solvent is a polar aliphatic solvent or polar aromatic solvent. Still more preferably, the solvent is a ketone, ester, acetate, alcohol, aprotic amide, aprotic sulfoxide, or aprotic amine. Examples of useful solvents include methyl ethyl ketone, methyl isobutyl ketone, n-amyl acetate, ethylene glycol butyl ether-acetate, propylene glycol monomethyl ether acetate, xylene, n-methylpyrrolidone (NMP), isobutanol (iBuOH), methanol (MeOH), propylene carbonate (PC), or blends of aromatic hydrocarbons. Alternatively, the solvent may be water or a mixture of water with small amounts of aqueous co-solvents.

Additional ingredients may be added to the low bake repair coating composition, such as, but not limited to pigments, rheology control agents, flow control additives, ultraviolet absorbers, and hindered amine light stabilizers.

In a preferred embodiment of the invention, the composition of the invention is utilized as a low bake repair pigmented coating composition or low bake repair clearcoat coating composition. Most preferably, the composition of the invention is utilized as a curable low bake clearcoat repair composition. In such a composition, the solvent may be present in the composition of the invention in an amount of from about 0.01 weight percent to about 99 weight percent, preferably from about 10 weight percent to about 60 weight percent, and more preferably from about 30 weight percent to about 50 weight percent.

In a particularly preferred embodiment, the composition of the invention is used as a clear and/or colorless low bake repair coating composition over a previously cured composite coating. The composite coating typically consists of a pigmented basecoat and a clearcoat. Such composite coatings are popular for their depth of color and liquid glossy surface appearance. They have found particularly wide acceptance in the field of automotive coatings. As indicated above, composite coatings are typically applied using a wet-on-wet method of application, wherein a the pigmented basecoat is not completely cured prior to the application of the clearcoat composition.

The invention further provides a method for repairing a composite coating. The method requires that a cured coated surface be provided. The cured coated surface will typically have a surface imperfection and/or defect which requires repair.

The cured coated surface will be comprised of a cured coating on a substrate.

The substrate may be plastic, metal, wood and mixtures thereof. Preferred substrates are plastic and metal automotive substrates, especially metal automotive body panels.

The cured coating may be any cured coating composition, including but not limited to, primers, sealers, bisects, clearcoats, topcoats and mixtures thereof. Preferred cured coatings are automotive coatings, especially topcoats, bisects, clearcoats and mixtures thereof. Most preferred for use as the cured coating are composite coatings employing a pigmented basecoat and a clearcoat wherein the clearcoat is applied prior to the curing of the pigmented basecoat.

Preferably, the pigmented basecoat composition will be a water borne basecoat composition such as is described in U.S. Pat. No. Re. 34,730, hereby incorporated by reference. Another preferred basecoat composition is a water borne composition based on hydroxyl functional acrylic crosslinked with melamine. Other pigmented basecoat compositions for such composite coatings are well-known in the art, and do not require explanation in detail herein. Polymers known in the art to be useful in basecoat compositions include acrylics, vinyls, polyurethanes, polycarbonates, polyesters, alkyds, and polysiloxanes. A preferred polymer is an acrylic polymer.

A composite coating applied to the surface of a substrate requires that after the pigmented basecoat is applied to the substrate, a clearcoat is applied to the substrate previously coated with the pigmented basecoat. The clearcoat is applied directly onto the basecoat. Preferably the clearcoat is applied to the basecoat before the basecoat is cured. Drying of the basecoat short of complete cure may occur.

Most preferred clearcoats for use in composite coatings used in the cured coated surface of the invention may comprise film forming component (A) discussed above.

Both the coating composition used to make the cured coated surface and the low bake repair curable composition may be coated on a surface or article by any of a number of techniques well-known in the art. These include, for example, spray coating, dip coating, roll coating, curtain coating, and the like. For automotive body panels, spray coating is preferred.

After an article is molded, casted, or coated with the either the coating composition(s) used to make the cured coated surface or the curable low bake repair coating composition of the invention, the coated article or surface is subjected to conditions so as to cure the applied coating. Although various methods of curing may be used, heat-curing is preferred. Generally, heat curing is effected by exposing the coated article to elevated temperatures provided primarily by radiative heat sources.

For coating compositions used to obtain the cured coated surface, the curing requirement will vary depending on the composition utilized. Generally, however curing schedules will range between about 220° F./104° C. and 395° F./201° C., preferably between 240° F./115.5° C. and 350° F./177° C., and most preferably between 250° F./121° C. and 286° F./141° C. The curing time will vary depending on the particular components used and physical parameters such as the thickness of the layers, however, typical curing times range from 15 to 60 minutes.

The curable low bake repair coating compositions of the invention will typically cure at a temperature of about less than 200°/93° C., preferably at a temperature of less than 190° F./88° C. and most preferably at a temperature between about 180° F./82° C. and 190° F./88° C.

The invention is further described in the following non-limiting examples.

EXAMPLE 1

A stock solution was prepared using 150 grams of a carbamate functional acrylic resin[1], 17.5 grams of a monomeric methylated melamine, and 54 grams of a solvent blend containing 14 grams of NMP, 6.8 grams of isobutanol, 16 grams of amyl acetate, and 17.2 grams of propylene carbonate.

[1] Prepared in accordance with U.S. Pat. No. 5,356,669, incorporated herein.

Each sample noted in the table below received 34 grams of the stock solution and 1% by weight of the identified catalyst, based on the total nonvolatile of the coating.

All samples were drawn down over U32AW237[2] electrocoat panels (4"×12") with a uniform thickness of 2 mil, using a draw-down bar, and at 180° F./82° C. for 10 minutes. The results are set forth below.

[2] A commercially available cathodic electrocoat composition available from BASF Corporation, Southfield, Mich.

TABLE 1

| Catalyst (B) | 1 minute MEK Soak[3] | MEK Double Rubs |
| --- | --- | --- |
| Al(ClO$_4$)$_3$ | OK | >200 |
| Zr(ClO$_4$)$_2$ | OK | >200 |
| Zn(ClO$_4$)$_2$ | FAILED | 8 |
| Mg(ClO$_4$)$_2$ | NO CURE | NO CURE |
| Zn(NO$_3$)$_2$ | NO CURE | NO CURE |
| Al(NO$_3$)$_3$ | OK | 110 |

[3] MEK Double Rub test and 1 Minute MEK Soak test conducted per ASTM D5402 and ASTM D740.

The test results indicate that an acceptable cure is obtained at a low bake cure schedule with the use of aluminum perchlorate, zinc perchlorate and aluminum nitrate. However, aluminum perchlorate and zinc perchlorate can be seen to provide a slightly better cure.

EXAMPLE 2

The above samples were drawn down over a waterborne silver metallic anionically stabilized polyester based basecoat that had been drawn down over an electrocoated steel panel (U32AW237 cathodic electrocoat). Both the basecoat and the clearcoat were drawn down with a 2 mil film thickness. The basecoat was flashed at 120° F. for 10 minutes before the application of the clearcoat.

The resulting panels were baked for 10 minutes at 180° F. The results are set forth below in Table 2.

TABLE 2

| Catalyst (B) | 1 minute MEK Soak | MEK Double Rubs |
| --- | --- | --- |
| Al(ClO$_4$)$_3$ | OK | >200 |
| Zr(ClO$_4$)$_2$ | OK | 180 |
| Zn(ClO$_4$)$_2$ | FAILED | 6 |
| Mg(ClO$_4$)$_2$ | NO CURE | NO CURE |
| Zn(NO$_3$)$_2$ | NO CURE | NO CURE |
| Al(NO$_3$)$_3$ | FAILED | 9 |

The difference in the degree of cure observed with aluminum nitrate is believed to be attributable to the underlying substrate, i.e., in Example 1, the clearcoat sample was drawn down directly over electrocoat, while in Example 2, the clearcoat was drawn down over a "wet" waterborne basecoat.

The results indicate that an acceptable cure is obtained at a low bake cure schedule with the use of aluminum perchlorate and zirconium perchlorate.

EXAMPLE 3

The samples from Example 1 were used, except that zinc nitrate and magnesium perchlorate were not used since they did not exhibit cure at 180° F.

Example 2 was repeated except that the composite coatings were baked for 10 minutes at 190° F. The results are set forth below.

TABLE 3

| Catalyst (B) | 1 minute MEK Soak | MEK Double Rubs |
| --- | --- | --- |
| Al(ClO$_4$)$_3$ | OK | >200 |
| Zn(ClO$_4$)$_2$ | FAILED | 53 |
| Al(NO$_3$)$_3$ | OK | >200 |
| Zr(ClO$_4$)$_2$ | OK | >200 |

EXAMPLE 4

All of the samples from Example 1, except the zinc nitrate and magnesium perchlorate, were drawn down over a solvent borne blue pigmented polyester based basecoat. The basecoat was applied to electrocoated steel panels as used in Example 2. Both the basecoat and the clearcoat sample were drawn down with a 2 mil film thickness. The basecoat was flashed for 10 minutes at 120° F. prior to the application of the low bake clearcoat sample.

The resulting panels were baked for 10 minutes at 190° F. The results are set forth below in Table 4.

TABLE 4

| Catalyst (B) | 1 minute MEK Soak | MEK Double Rubs |
| --- | --- | --- |
| Al(ClO$_4$)$_3$ | OK | >200 |
| Zn(ClO$_4$)$_2$ | FAILED | 92 |
| Al(NO$_3$)$_3$ | OK | >200 |
| Zr(ClO$_4$)$_2$ | OK | >200 |

Acceptable low bake cures were achieved at a low bake cure schedule with the use of aluminum perchlorate, aluminum nitrate and zirconium nitrate.

Differences in cure relative to the above examples are believed to be attributable to the action of volatiles from the basecoats employed.

What is claimed is:

1. A method for providing a low bake repair to a cured coating, comprising:

providing a cured coated surface, applying a low bake repair coating to at least a portion of the cured coated surface, the low bake repair coating comprising, (A) a film forming component comprising (a) a first component comprising a compound having appended thereto at least one carbamate or urea functional group, or a group convertible to a carbamate or urea group, and (b) a second component comprising a compound reactive with said carbamate or urea groups on component (a), and (B) a catalyst comprising a compound selected from the group consisting of Al(ClO$_4$)$_2$, Zr(ClO$_4$)$_2$, and Al(NO$_3$)$_2$, and subjecting the low bake repair coating to a temperature of less than 200° F. for a time sufficient to cure the low bake repair coating.

2. The method of claim 1, wherein the cured coated surface is a surface coated with a composite coating comprising a basecoat and a clearcoat.

3. The method of claim 1, wherein the low bake repair coating is a clearcoat.

4. The method of claim 1, further comprising applying a low bake repair coating comprising a catalyst B) comprising a compound selected from the group consisting of Al(ClO$_4$)$_2$ and Zr(ClO$_4$)$_2$.

5. The method of claim 4 further comprising applying a low bake repair coating comprising from 0.01 to 7.0 percent by weight, based on total nonvolatile of the coating, of a catalyst B) comprising a compound selected from the group consisting of Al(ClO$_4$)$_2$ and Zr(ClO$_4$)$_2$.

6. The method of claim 5 comprising applying a low bake repair coating comprising about 0.1 to 2.0 percent by weight, based on total nonvolatile of the coating, of Al(ClO$_4$)$_2$.

7. The method of claim 1 wherein first component (a) comprises a compound selected from the group consisting of oligomers having appended thereto more than one functional group selected from the group consisting of carbamate groups, urea groups and groups converted to carbamate or urea groups, said oligomers having a molecular weight of between 148 and 2000, polymers having appended thereto more than one functional group selected from the group consisting of carbamate groups, urea groups and functional groups convertible to carbamate or urea groups, said polymers having a molecular weight of greater than 2000, and mixtures of said polymers and oligomers.

8. The method of claim 1 wherein said first component (a) comprises a carbamate or urea functional polymer selected from the group consisting of polyester, epoxy, alkyd, urethane, acrylic, polyamide and polysilane polymers and mixtures thereof.

9. The method of claim 7 wherein first component (a) comprises a polymer backbone having appended thereto more than one carbamate functional group, said first component being represented by randomly repeating units according the formula:

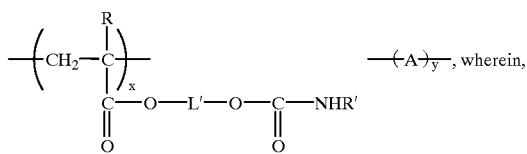

R represents H or CH$_3$,

R' represents H, alkyl, or cycloalkyl,

L represents a divalent linking group,

A represents repeat units derived from one or more ethylenically unsaturated monomers, x represents 10 to 90 weight %, and y represents 90 to 10 weight %.

10. The method of claim 9 wherein A represents repeat units derived from more than one ethylenically unsaturated monomers, more than one monomer having appended thereto a carbamate group.

11. The method of claim 9, wherein A represents repeat units derived from one or more ethylenically unsaturated monomer, said ethylenically unsaturated monomers comprising one or more acrylic monomers.

12. The method of claim 11 wherein 10–90% of said ethylenically unsaturated monomers are acrylic monomers.

13. The method of claim 9 wherein —L— is represented by the formula —COO—L', where L' is a divalent linking group.

14. The method of claim 1 wherein first component (a) comprises an oligomer having appended thereto more than one functional group selected from the group consisting of carbamate groups, urea groups, and groups subsequently converted to carbamate or urea groups, said oligomer having a molecular weight of between 148 and 2000.

15. The method of claim 1, wherein film forming component (A) further comprises (b) a second component comprises a compound selected from the group consisting of melamine formaldehyde resins, urea resins, polymers having acrylamide groups, polymers having methylol or alkoxymethyl groups, polyanhydrides and polysiloxanes.

16. The method of claim 15, wherein second component (b) comprises a compound selected from the group consisting of melamine formaldehyde resins and urea resins.

17. The method of claim 1, further comprising subjecting the low bake repair coating to a temperature between about 180° F. to 190° F. for about five to fifteen minutes.

* * * * *